United States Patent

[11] 3,585,456

[72] Inventor Lawrence Phillips, Jr.
840 Inverness, Pasadena, Calif. 91103
[21] Appl. No. 868,291
[22] Filed Oct. 17, 1969
[45] Patented June 15, 1971
Continuation-in-part of application Ser. No. 693,245, Dec. 26, 1967, now abandoned.

[54] ELECTRIC SERVICE CENTER FOR MOBILE HOMES AND THE LIKE
15 Claims, 11 Drawing Figs.

[52] U.S. Cl. .................................................. 317/112,
174/38, 174/51, 174/55, 317/120
[51] Int. Cl. .................................................. H02b 1/04
[50] Field of Search .......................................... 317/112,
120; 174/38, 44, 48, 51—53, 55, 58, 60, 66

[56] References Cited
UNITED STATES PATENTS

| | | | |
|---|---|---|---|
| 2,410,287 | 10/1946 | Jaberg | 174/53 |
| 1,938,309 | 12/1933 | Williams | 174/55 |
| 2,002,491 | 5/1935 | Despard | 174/55 |
| 2,691,724 | 10/1954 | Hoffman | 317/101 |
| 3,155,882 | 11/1964 | Casey | 317/119 |

FOREIGN PATENTS

| | | | |
|---|---|---|---|
| 391,825 | 9/1965 | Switzerland | 174/38 |
| 1,039,015 | 8/1966 | Great Britain | 174/48 |
| 1,265,805 | 4/1968 | Germany | 174/48 |

Primary Examiner—Laramie E. Askin
Assistant Examiner—Gerald P. Tolin
Attorney—Christie, Parker and Hale ABSTRACT: The electric service center has a housing adapted to extend a predetermined distance above its installation in the ground to provide electrical service to mobile homes and the like. The housing is adapted to receive a removable plate which carries one or more plug receptacles and one or more circuit breakers. A neutral connection is also carried by the plate. The plug receptacle, circuit breaker and neutral connection are electrically coupled together. When secured to the housing, the plate's circuit breaker and neutral connection are electrically coupled to a source of power through bus bars. The service ampere rating is changed by removing the plate and substituting a plate having a plug receptacle, neutral connection and a circuit breaker with the desired rating. An alternate embodiment provides sidewalls on either side of each plate to protect the plate's circuit breaker, neutral connection and plug receptacle. A rain guard is also provided on each plate to protect its circuit breaker and plug receptacle. Bus bars within the housing are disposed in rigid tubes to prevent inadvertent contact of the bus bars with, for example, the sidewalls of the plates. An insulating sheet in the housing between the bus bars and the opening in the housing for the removable plates provides further protection for a user.

ELECTRIC SERVICE CENTER FOR MOBILE HOMES AND THE LIKE

CROSS REFERENCE TO RELATED APPLICATION

This is a continuation-in-part application of application Ser. No. 693,245, filed Dec. 26, 1967 now abandoned.

BACKGROUND OF THE INVENTION

The present invention relates to service centers for supplying electric current to mobile homes and the like and, more particularly, to a service center adapted to provide different ampere ratings by replacing a mounting plate which carries a plug receptacle and a circuit breaker without rewiring the center.

Electric service centers are widely used in mobile home parks, boat mooring docks and other places where mobile units require electric service to operate a variety of equipment and appliances. The load requirement of mobile units determines their ampere requirements. Because of large load variations within a given class of mobile units, the current requirements between units varies widely. For circuit protection, each service center has to include a circuit breaker or the like rated at the ampere rating of the mobile unit it is to service.

Each electric service center also has one or more plug receptacles to receive a vehicle's male plug and establish service to it. Each receptacle has an ampere rating corresponding to that of its cooperating circuit breaker. Presently available receptacles vary according to their ampere rating to prevent insertion of a male plug having a different rating.

Previously known service centers have had a fixed ampere rating. If a mobile unit had an ampere rating which was either larger or smaller than the service center it used, the service center was rewired by an electrician to install a new receptacle with a matching circuit breaker. This was very inconvenient, time consuming and expensive for both the operator of the service facility and the operator of the mobile vehicle.

Therefore, there is a present need for an electric service center which enables a quick and simple change of its ampere rating to suit the wide variety of ampere ratings of mobile units. The service center should be adapted for a change of its current rating without the need for highly skilled electricians.

SUMMARY OF THE INVENTION

The present invention provides an electric service center which is adapted to have its ampere rating changed in a simple and expedient manner.

The present invention contemplates the use of a support structure in the form of a housing which is adapted to extend a predetermined distance above ground level for providing electric service to mobile units. The housing provides space and protection for conductors and the like which are required for the electric service. The housing is adapted to receive any one of a plurality of circuit breaker mounting plates. Each mounting plate has at least one plug receptacle, at least one circuit breaker with a matched ampere rating, and a neutral connection, all of these electrical elements being electrically coupled together. However, each plate carries a different rated circuit breaker and matching receptacle from the other plates. Permanent conductor means, such as bus bars, are secured in the housing to provide current to the circuit breaker, plug receptacle and neutral connection of an installed mounting plate from a source of power. Each mounting plate's carried circuit breaker, plug receptacle, and neutral connection are adapted for "quick release" coupling with the housing's conductor means. This may be accomplished by constituting the male conductors of the housing, and the circuit breaker and the neutral connection of each plate of the plug-in type.

As a consequence of this construction, the ampere rating of a service center may be changed merely by changing a mounting plate not of the required ampere rating to one which matches that of the mobile unit to be serviced.

More in particular, a supply of relatively inexpensive mounting plates having different ampere rated circuit breakers and receptacles can be kept on hand at mobile service facilities. A single plate is inserted in each service center to correspond to the ampere rating of the mobile unit which is to be serviced by it. Time consuming and relatively costly changes in the ampere rating of mobile unit service centers are therefore avoided. Because of the simplicity of changing from one rating to another, there is no need for an electrician or other highly skilled person to effect a change of rating for a given service center. As a consequence the mobile service center can handle any number of mobile vehicles in any of its locations, irrespective of ampere requirements of the individual mobile vehicles.

In a presently preferred construction of the present invention, each of the mounting plates has upstanding sidewalls adapted to fit over sidewalls of the housing. These sidewalls provide mechanical protection for the plug receptacle, neutral connection, and circuit breaker carried by the mounting plate. In addition, a rain guard is provided on each mounting plate to prevent rain from wetting the plate's plug receptacle and circuit breaker. This rain guard may be a generally U-shaped member extending upwardly from the face of each plate and bounding the plate's receptacle and circuit breaker around their sides and top. The rain guard may be provided with a hinged cover to provide frontal protection for the receptacle and circuit breaker of its plate. As was previously mentioned, bus bars may provide the coupling of the circuit breaker and neutral connection to a source of power. Preferably, a rigid tube houses each bus bar to prevent possible contact of the bus bars with the sidewalls of the plates during a change in service rating and to prevent bypassing of a service meter. It is also preferred to have a sheet of insulating material between the bus bars and the mounting plates to further protect an attendant from touching the bus bars while changing the service rating of the service center.

For servicing some mobile units a plug-in receptacle is not practical. An example of this type of service is 100 ampere service. In these instances, the unit to be serviced must be wired directly into the circuit breaker. However, with existing service centers there may be little room to conveniently wire the unit to be serviced to its breaker. To overcome this wiring problem and provide a rainproof service center, an embodiment of the present invention provides a plate which has a downwardly flaring portion below a circuit breaker cutout which encloses the interior of the housing the plate is used with. An opening at the bottom of the flared portion provides for the passage of the conductor of the unit to be serviced to the circuit breaker. Because the conductor to be serviced has to be wired to the circuit breaker, the circuit breaker is not actually carried by the plate. The plate then acts as a protective cover for the circuit breaker and the conductor to it.

These and other features, aspects and advantages of the present invention will become more apparent from the following description, appended claims and drawings.

Description of the Preferred Embodiments

Figures 1, 2, 3:
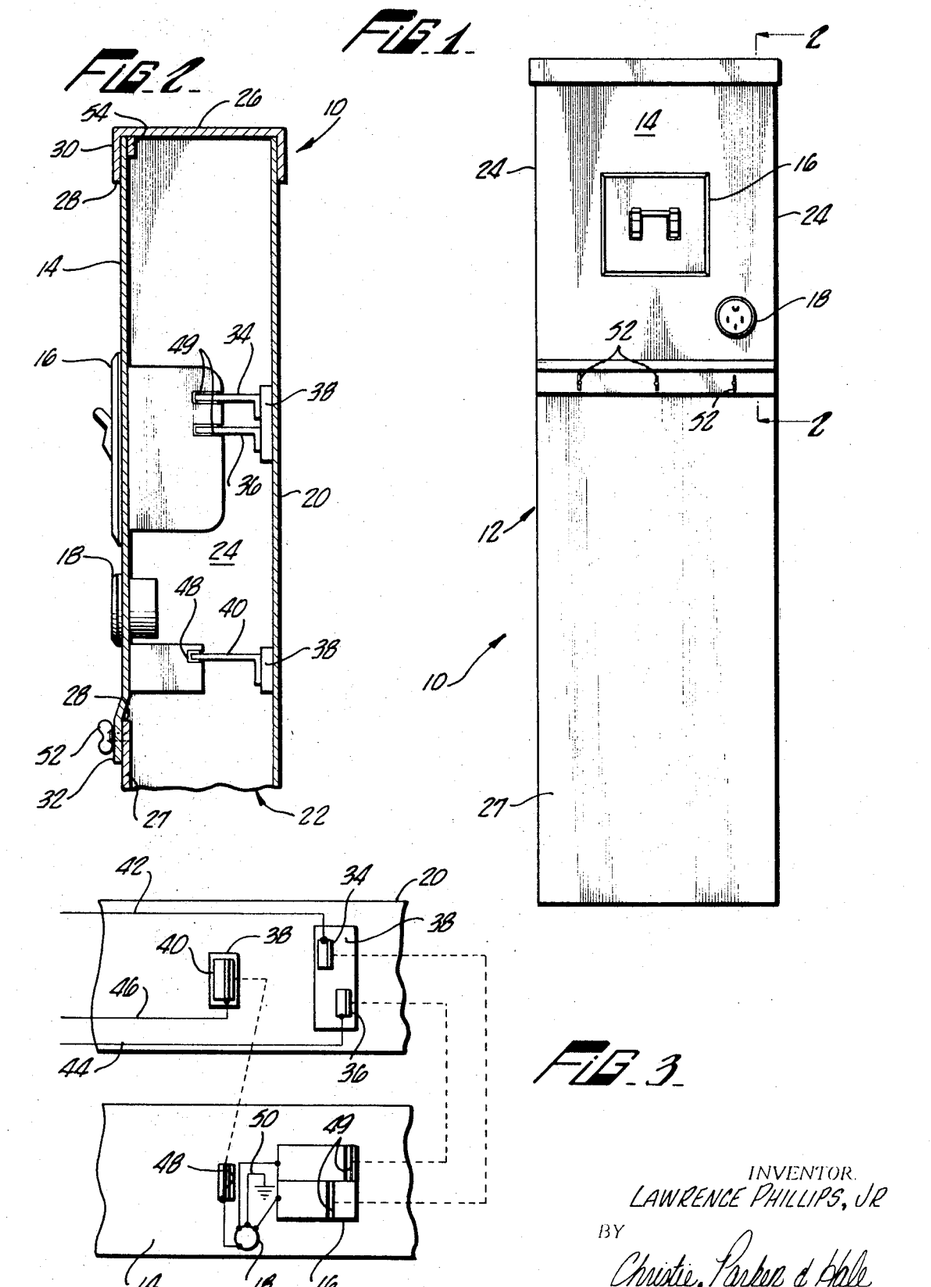
FIG. 1 is an elevational view of the service center constructed in accordance with the present invention.
FIG. 2 is a fragmentary, enlarged sectional view taken along line 2—2 of FIG. 1.
FIG. 3 is a schematic diagram showing the electrical coupling in the service center shown in FIGS. 1 and 2.

FIGS. 1 and 2 illustrate a service center 10 which includes a housing or support structure 12 with a removable mounting plate 14. The mounting plate carries a circuit breaker 16 and an electrical receptacle or outlet 18. A common application for this type of service center is found in mobile home or trailer parks, alongside mooring docks, at other locations where mobile units require electric service, and temporary service at construction sites.

Circuit breaker 16 and plug receptacle 18 are of standard construction. The circuit breaker illustrated is for a single-phase power supply. It includes two circuit protecting elements ganged together through their on-off switches as shown in FIG. 2. Some circuit breakers have but a single on-off switch to control two poles in one case. Receptacle 18 is electrically coupled to circuit breaker 16 and provides the power outlet for a mobile unit. The circuit breaker and plug receptacle have the same ampere rating. The receptacle shown is for 50 ampere service while the circuit breaker is a two-pole 120/240 volt circuit breaker. The service complementary may be readily adapted to receive an electric meter.

Housing 12 includes an upwardly extending back wall 20 which is integrally formed with a boxlike base 22. The housing also includes parallel side-walls 24 which are integral with backwall 20 and extend up from base 22. A cover 26 is mounted on the side and backwalls. A front wall 27 complements backwall 20 and sidewalls 24 in defining base 22 as a four-sided enclosure. Front wall 27 is foreshortened with respect to its complementary side and backwalls to define a rectangular opening 28 into which mounting plate 14 is fitted. Preferably, a flange 30 of the cover extends downwardly over mounting plate 14 to protect the interior of the service center from the elements. For this same reason, mounting plate 14 is flared outwardly at its lower end to form a flange 32 which covers the upper edge of front wall 27.

A pair of spaced-apart bus bars 34 and 36 are provided. These bus bars are electrically insulated from backwall 20 by a suitable insulator block 38. The bus bars are mounted to the backwall through the insulator block. A third bus bar 40 is also secured to backwall 20 and insulated therefrom by a second insulator block 38. Referring to FIGS. 2 and 3, bus bars 34 and 36 are electrically coupled with a pair of leads 42 and 44, respectively. These leads are the A and B phase leads of a single-phase electrical power supply (not shown). Bus bar 40 is connected with a neutral lead 46 of the power supply.

A neutral receptacle 48 is mounted on the interior side of mounting plate 14. Thus, mounting plate 14 carries a plug receptacle, a neutral receptacle and a circuit breaker. Receptacle 48 provides the neutral connection of plate 14 and has a U-shaped spring clip or jaw-type conductor for engaging bus bar 40. A pair of U-shaped spring clip on jaw-type conductors 49 are included with circuit breaker 16. These conductors engage bus bars 34 and 36 to electrically connect the circuit breaker with the A and B phases of the power source. Receptacle 48 with its U-shaped spring clip-type conductor, as well as the U-shaped conductors of circuit breaker 16, are standard means to couple electrical elements together. Circuit breakers are available which have these types of conductors.

FIG. 3 depicts the electrical coupling of the mounting plate's carried elements to the bus bars. This FIG. also shows the wiring of plug receptacle 18. The neutral terminal of receptacle 18 is coupled through a lead to receptacle 48 for electrical communication with bus bar 40. The A and B phase terminals of receptacle 18 are connected to the A and B circuit breaker phases of circuit breaker 16, as shown. Receptacle 18 is grounded at 50 in a conventional manner.

The U-shaped spring clip-type conductors and the bus bars thus comprise mating female and male conductor elements of the plug-in type which enables the rapid coupling and uncoupling of mounting plate 14 from support structure 12 and a rapid change of ampere rating.

A plurality of removable wingnuts 52 secure the mounting plate to the support structure. The plate is secured to the cover 26 adjacent the flange 30 by inserting it between the flange and a bar 54 spaced apart therefrom. Alternatively, wingnuts may be provided adjacent flange 30 of the cover 26. Wingnuts are preferred since they facilitate the ease with which the mounting plate is installed to the support structure. They can, of course, be replaced by other suitable fasteners. Circuit breaker 16 and plug receptacle 18 of mounting plate 14 have like ampere ratings. Their rating may be, for example, 50 amperes. Neutral receptacle 48 has a rating of at least that of the plug receptacle and circuit breaker, but may be rated at the maximum rating of the service center, say 150 amperes. With each service center, a plurality of such plates are provided. Each plate has a breaker and a receptacle of a like ampere rating but one which differs from the ampere ratings of the other mounting plates. As an example, matched circuit breakers and receptacles of 15, 20, 30, 50 and 60 may be provided with different mounting plates. Neutral receptacle 48 may be mounted on the housing, in which case bus bar 40 is mounted to plate 14.

When, for example, a mobile home or a trailer having a particular ampere rating is pulled up to service center 10 and the particular rating of the trailer does not correspond to the rating of the breaker and the receptacle on the installed mounting plate, the trailer's plug cannot be inserted into the receptacle on the plate. This is done as a safety measure to prevent insertion of a plug having one rating into a receptacle having another rating. The ampere rating of the service center must now be changed to correspond to that of the trailer. First, the circuit breaker is turned off. Then, the plate installed on the service center is removed. A mounting plate having a receptacle and a circuit breaker of an ampere rating which corresponds to that of the trailer is selected and installed in the support structure.

Insertion of the mounting plate in opening 28 of the service center engages the spring clip conductor of neutral receptacle 48 with the bus bar 40. Conductors 49 of circuit breaker 16 engage bus bars 34 and 39. Receptacle 18 is thereby electrically coupled with the power source. After wingnuts 52 have been tightened, the trailer's plug can be inserted into the receptacle 18.

It should be noted that when a mounting plate is removed, all electrical connections between the elements carried by the mounting plate and a source of power are broken. Thus after removal of mounting plate 14, there is no connection between the circuit breaker and neutral receptacle and their corresponding bus bars.

The effective ampere rating of service center 10 has thus been changed without the need for extensive, time consuming, and costly wiring which otherwise would have been required. Bus bars 34, 36 and 40, as well as the leads 42, 44 and 46 are, of course, sized for the maximum possible current to which they might be subjected. Thus, if one of the mounting plates supplied with the service center has a rating of, say, 150 amperes, the bus bars as well as the leads are adequate to safely withstand such a current.

Figure 4:
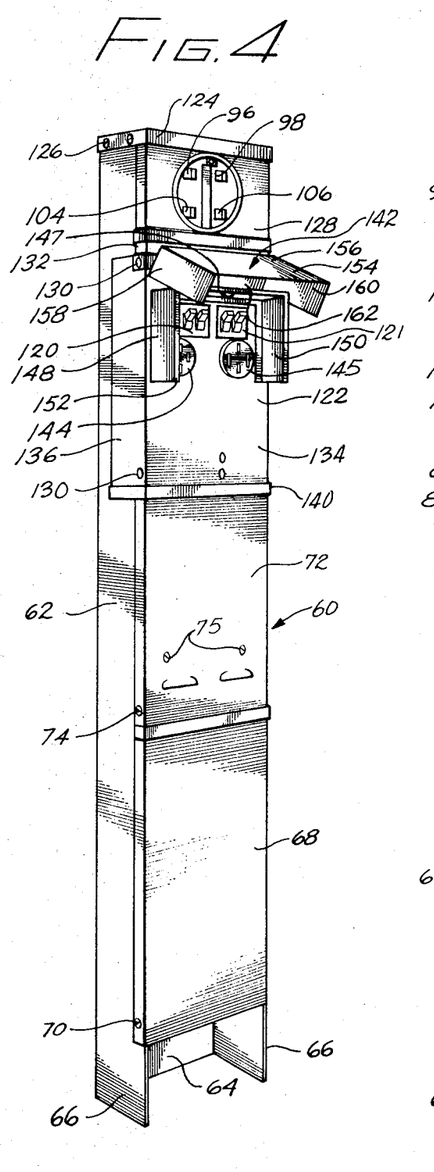
FIG. 4 is a view, in perspective, of an alternate and presently preferred embodiment of a service center in accordance with the present invention.
Figure 5:
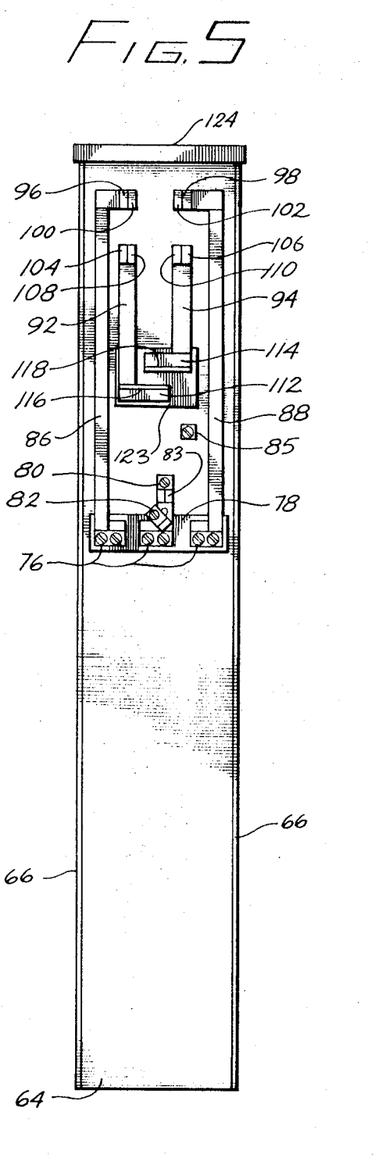
FIG. 5 is a front elevational view of the embodiment of the invention illustrated in FIG. 4 showing the interior of the service center.

FIGS. 4 through 9 depict the presently preferred embodiment of the present invention. FIG. 4 shows explicitly the use of more than one circuit breaker-plug receptacle pair. As in the previously described embodiment, a support structure or housing 60 is provided. This housing is adapted to be installed in the ground with conductors passing upwardly through its hollow interior for providing electric service at a predetermined position above ground level. The housing must extend a predetermined distance above the ground to prevent snow, slush and the like from reaching exposed circuit elements. The housing includes a sheet metal channel 62. The channel defines a backwall 64 and two parallel, spaced-apart sidewalls 66 extending at right angles from the backwall to define the interior of the housing. A removable lower cover plate 68 is secured to sidewalls 66 as by screws 70. A removable intermediate cover plate 72 is also secured to the sidewalls as by screws 74. A pair of screws 75 provide for the mounting of a moisture barrier within the housing to prevent ground moisture from reaching exposed circuit elements within the housing. These two plates cover conductors from a source of power, through the ground, and up into housing 60. After the service center has been wired, the lower and intermediate covers are essentially permanently in place. The conductors extending upwardly within the housing are connected to a plurality of terminal blocks. These terminal blocks are indicated by reference numeral 76 in FIG. 5. An insulating block 78 provides the mounting of terminal blocks 76 to backwall 64 and the insulation between the blocks 76 to backwall 64 and the insulation between the blocks and backwall. The intermediate of these terminal blocks is for neutral lugs 80 and 82, each neutral lug being for different wire sizes from a source of power. A spring clip or jaw 83 mounted on neutral lug 80 receives a stab-type neutral connection 84 carried by a removable circuit breaker mounting plate to provide a plug-in-type connection for neutral. A ground lug 85 for permanent installations of, say 70 ampere, 100 ampere or 125 ampere service is affixed to the backwall 64 of housing 60. Outer bus bars 86 and 88 are connected to the outer of terminal blocks 76 to provide line current to a meter 90, shown in FIG. 6. Interior bus bars 92 and 94 provide load current from the meter. The outer and interior bus bars are, of course, insulated from backwall 64. Bus bars 86 and 88 terminate at bus bars 96 and 98. Bus bars 96 and 98 have upstanding spring clips or jaws 100 and 102 for receiving stab-type conductors of meter 90. A pair of bus bars 104 and 106 having upstanding spring clips or jaws 108 and 110 provide a similar circuit coupling for complementary stab-type conductors of meter 90 for current from the meter to bus bars 92 and 94. A pair of bus bars 112 and 114 of bus bars 92 and 94 have upstanding flanges 116 and 118 for providing current to a pair of circuit breakers 120 and 121 of a mounting plate 122. Bus bars 112 and 114 are mounted to an insulator block 123 which is secured to backwall 64.

A cover 124 is secured to housing 60 as by screws 126 in sidewalls 66. A meter plate 128 is also installed on housing 60 in a similar manner to close the upper front of the housing.

Mounting plate 122 is shown secured to sidewalls 66 of housing 60 as by fasteners 130 at its top and bottom. An adapter plate 132 between meter plate 128 and circuit breaker mounting plate 122 is provided to complete the weatherproofing of the interior of the housing and to provide for a different type of circuit breaker mounting plate to be described subsequently.

Figure 6:
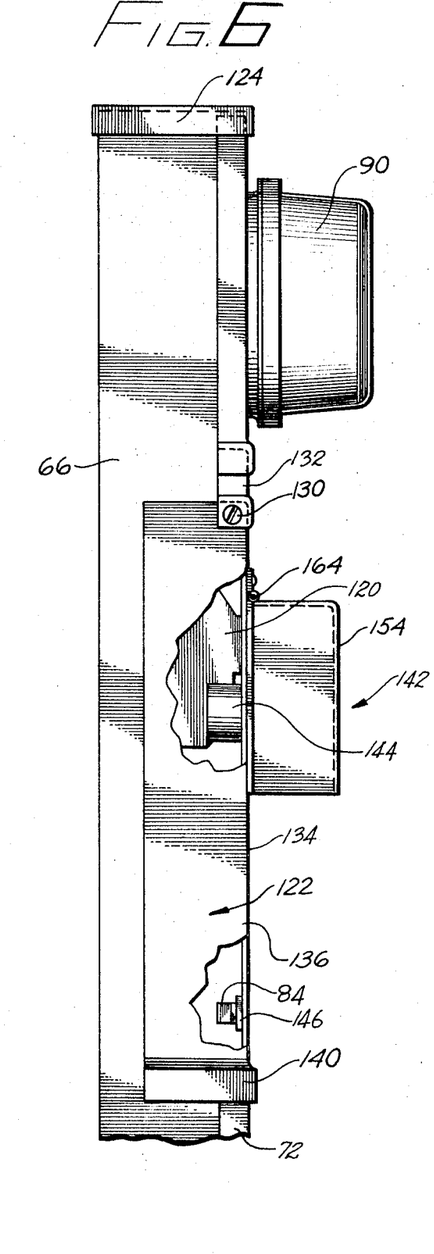
FIG. 6 is a side elevation of the top of the service center illustrated in FIGS. 4 and 5 illustrating the use of an electric service meter with the service center of the present invention.
Figure 7:
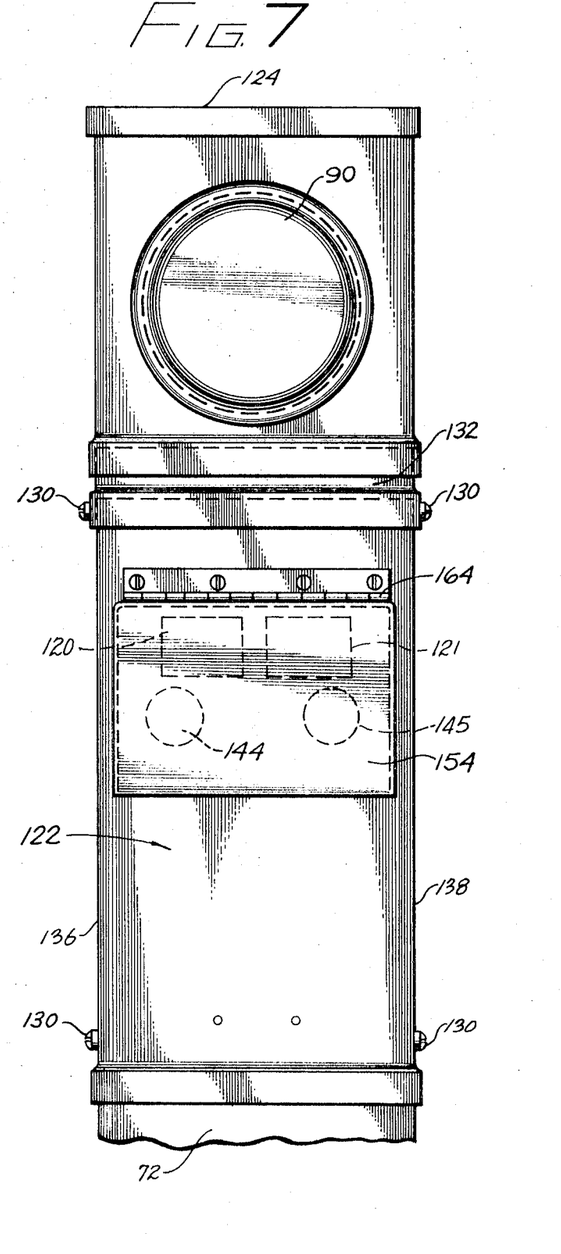
FIG. 7 is a front elevation of FIG. 6.

With specific reference to FIGS. 4, 6 and 7, mounting plate 122 has a generally flat front wall 134 and a pair of sidewalls 136 and 138 extending perpendicularly to the front wall. Together these walls define a channel-shaped structure. The bottom of mounting plate 122 is flanged outwardly at 140 for its receipt over the top of intermediate plate 72 to provide a weather barrier. A rain guard 142 is secured to front wall 134 of mounting plate 122 to protect a pair of plug receptacles 144 and 145 and circuit breakers 120 and 121.

As previously mentioned, mounting plate 122 carries a pair of circuit breakers 120 and 121, and a pair of plug receptacles 144 and 145. The mounting plate also carries neutral stab-type conductor 84 mounted through an insulator block 146 to front wall 134. Each of the circuit breakers illustrated has two circuit protecting elements ganged together through their on-off switches. Circuit breaker 120 is in electric circuit with receptacle 144 and neutral stab 84 while circuit breaker 121 is in electric circuit with receptacle 145 and the neutral stab. The wiring of the embodiment illustrated in FIGS. 4 through 9 is essentially identical to that described with reference to FIGS. 1 through 3 and, therefore, will not be further discussed.

It should be noted that mounting plate 122 has plug receptacle-circuit breaker pairs, in this case two 50 ampere services. Therefore the service center can accommodate two distinct services, say a 50 used for the household service, a 30 air conditioning service and a 50 ampere household service of a mobile home. A large variety of combinations of two or more plug receptacle-circuit breaker pairs can be carried by mounting plate 122 and different combinations can be provided by other mounting plates. An example of a different combination is for providing three independent services through three circuit breaker-plug receptacle pairs for a mobile home's household service, air conditioner, and a heater used to keep the home's water supply from freezing. For this combination a 50 ampere circuit breaker-plug receptacle pair may be used for the household services, a 30 ampere circuit breaker-plug receptacle pair may be used for the air conditioner service, and a 15 ampere circuit breaker-plug receptacle pair may be used for the heater. Another example of the versatility afforded by the service center of the present invention is in providing a single disconnect for two or more services from the service center. This can be done, for example, by having a main 50 ampere circuit breaker for the A and B phases of a power supply feeding a 30 ampere A and B phase circuit breaker and a 20 ampere A phase circuit breaker. This broad range of adaptability results from the construction of the mounting plate and the fact that bus bars 112 and 114 can accept a number of circuit breakers of the same or different ampere rating.

In greater detail, rain guard 142 includes an inverted U-shaped piece having an upper, horizontal wall 147 and two sidewalls 148 and 150. Together, the upper wall and two sidewalls bound the sides and tops of plug receptacles 144, 145 and circuit breakers 120, 121. A continuous lip 152 extends outwardly from sidewalls 148, 150 and upper wall 147 to divert water for runoff below the plug receptacles and circuit breakers. To complete the weather protection for circuit breakers 120, 121 and receptacles 144, 145, a hinged cover 154 is provided. This cover is hinged to front wall 134 and is of a three-sided, boxlike configuration defined by a front wall 156, two sidewalls 158 and 160, and an upper wall 162. As seen in FIGS. 6 and 7, a hinge 164 secures the cover to the mounting plate. The rain guard is open at its bottom to provide access for male plugs to receptacles 144 and 145 from the mobile unit being serviced.

Figure 8:
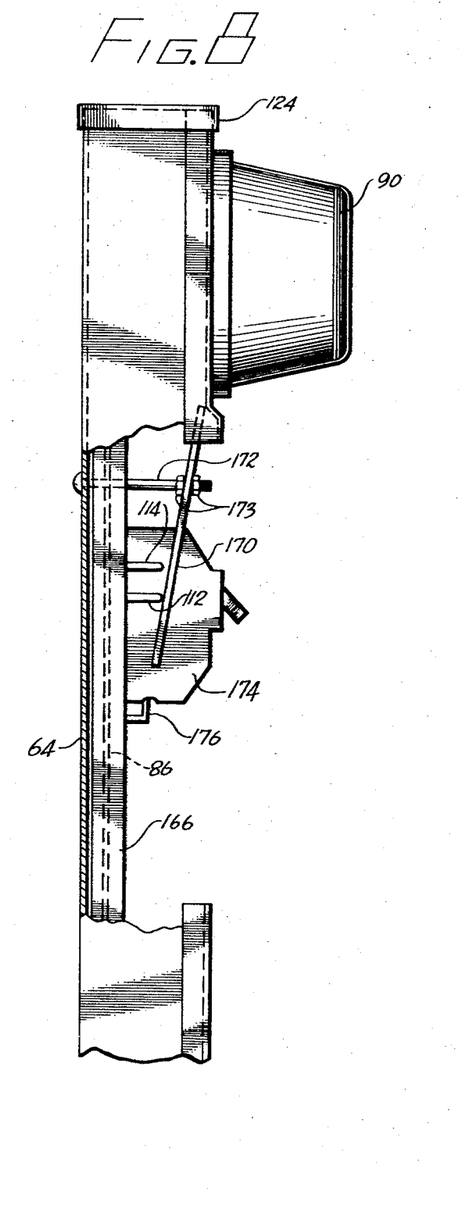
FIG. 8 is a side elevation of the FIG. 4 embodiment illustrating a sheet of rigid insulation and rigid tubes used to protect an attendant from conductors during a change of service.
Figure 9:
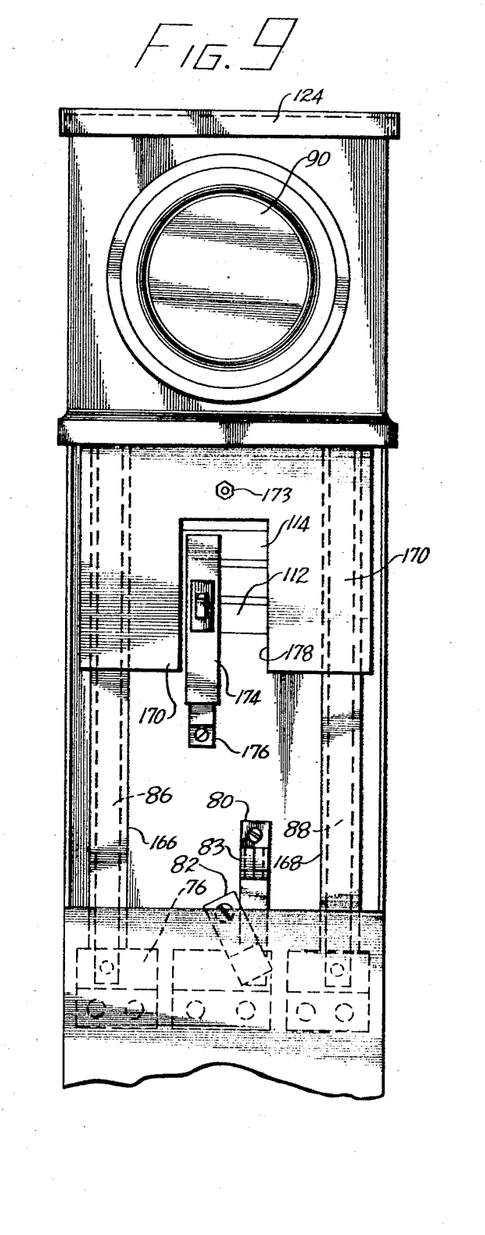
FIG. 9 is a front elevation of FIG. 8.

With specific reference to FIGS. 8 and 9, three important features of the present invention are illustrated. Exterior bus bars 86 and 88 are shrouded by rigid tubes 166 and 168. The rigid tubes which shroud bus bars 86 and 88 extend from terminal blocks 76 to meter bus bars 96 and 98. These tubes may be made of polyvinyl chloride, or the like. The tubes provide a guard against the edges of sidewalls 136 and 138 or mounting plate 122 contacting the live bus bars. Thus, there is protection for an attendant changing the service rating of the service center. The tubes are preferred over standard insulation because the latter can be violated by sharp corners of the cover plate. The tubes also prevent bypassing meter 90.

The second feature illustrated in FIGS. 8 and 9 is an insulation plate 170 secured to backwall 64 of housing 60 as by stud or bolt 172 and a pair of nuts 173 on the stud and on the front and backsides of the insulation plate. This plate acts as a guard against inadvertent touching of bus bars 112 and 114. A permanent circuit breaker 174 is illustrated in these FIGS. The circuit breaker is coupled to bus bars 112 and 114. A clamp 176 permanently secures this circuit breaker in place. The neutral lead from circuit breaker 174 is attached to neutral lug 82. The provision of the permanent breaker still admits to the provision of other circuit breakers and receptacles in mounting plate 122. Circuit breaker 174 may be used, for example, for circuit protection for street lights. Insulating plate 170 extends only so far as is necessary to mask bus bars 112 and 114.

The plate has a U-shaped cutout 178 for receiving permanent breaker 174 as well as the breaker carried by mounting plate 122. The insulating plate is at an angle to admit to the receipt on bus bars 112 and 114 of a circuit breaker carried by the mounting plate.

To change a rating of a service unit, one needs only to remove screws 130 to free mounting plate 122 from housing 60. Adapter plate 132 is then moved downwardly and outwardly toward the attendant. Circuit breaker mounting plate 122 is then pulled straight out towards the attendant. With removal of mounting plate 122, the neutral and A and B phases of the power supply are all disconnected from the circuit breaker and neutral stab of the mounting plate. An interchangeable mounting plate with the desired service rating is then installed by reversing this procedure. That is, an interchangeable mounting plate is pressed into place with its fastener holes in register with the holes in the housing, its circuit breaker engaged with bus bars 112 and 114, and its neutral stab with jaw or clip 83. The adapter plate is then installed by fastening its upper end under the flange of the meter plate. The fasteners are then installed. To provide service, one merely lifts the cover of the rain guard upwardly, inserts a male plug into the appropriate receptacle of the mounting plate and then actuates its circuit breaker.

Figure 10:
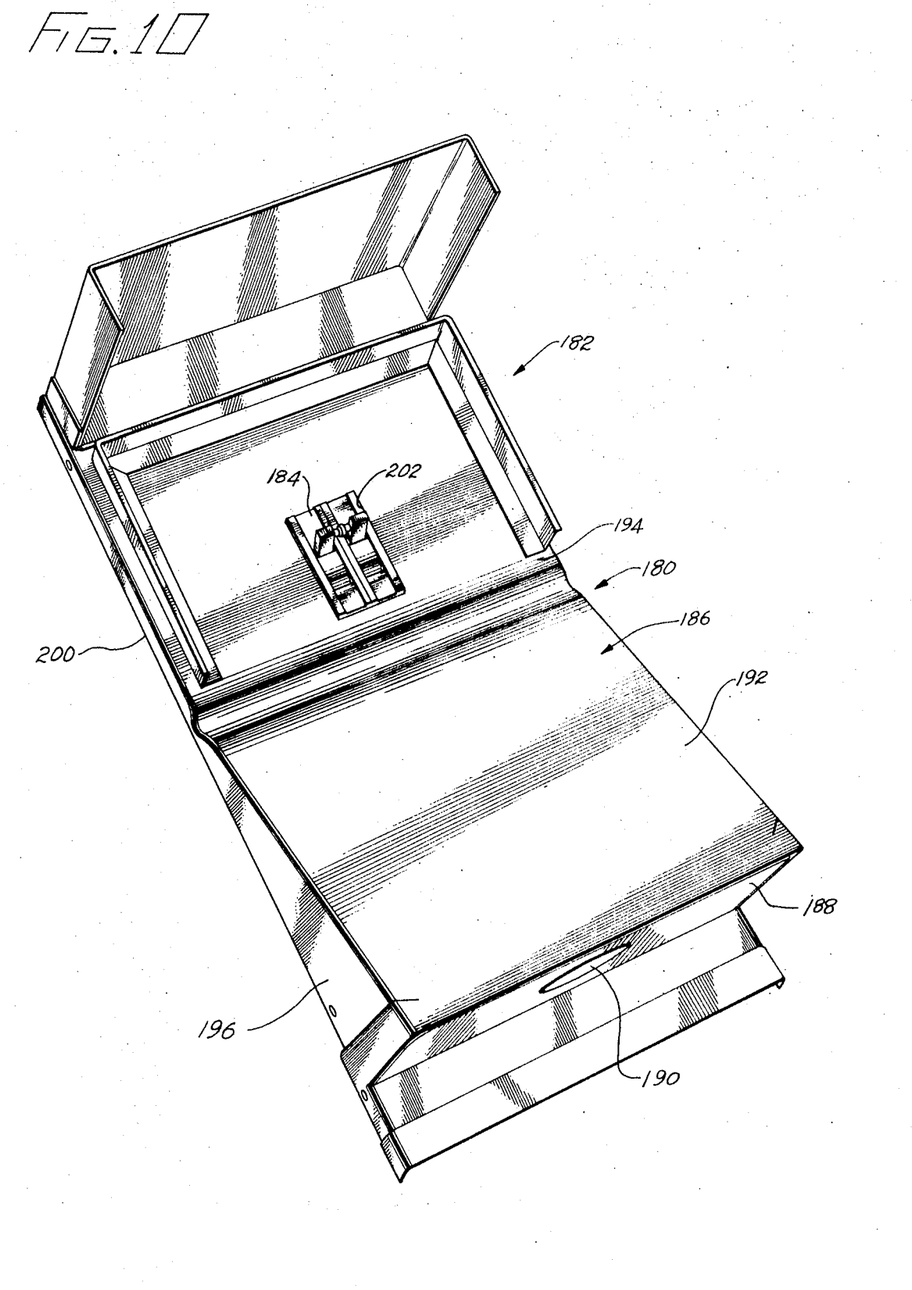
FIG. 10 is a perspective view of an alternate embodiment of the mounting plate of the present invention.

FIG. 10 illustrates an alternate embodiment of a circuit breaker plate which is indicated generally by reference numeral 180. This circuit breaker plate is used where no plug receptacle is used, for example, in a 100 ampere service. The general configuration of the circuit breaker plate is the same as mounting plate 122 described with reference to FIGS. 4 through 9 in that a rain guard 182 is provided and the mounting plate is removably securable to sidewalls 66 of housing 60. However, adapter plate 132 is removed from the housing for this installation. The rain guard is essentially identical to rain guard 142 and will not, therefore, be further described.

The mounting plate flares outwardly and downwardly of a circuit breaker 184 which extends through it from bus bars 112 and 114. The flared-out portion, indicated by reference numeral 186, has a bottom wall 188 where an opening 190 is present for the passage of a conduit to the circuit breaker from a mobile unit to be serviced. Flared-out portion 186 has a front wall 192 which angles away from a wall 194 and closing sidewalls 196 which extend from the front wall toward the back of the breaker plate. These closing sidewalls complement and form an extension of sidewalls 200 which depend away from wall 194. Together, the sidewalls provide for the mounting of the breaker plate on housing 60. Wall 194 has a cutout 202 for receiving a circuit breaker 184. In this embodiment, breaker plate 180 does not carry circuit breaker 184 because of the necessity of wiring the breaker to the conduit of a mobile unit to be serviced.

Figure 11:
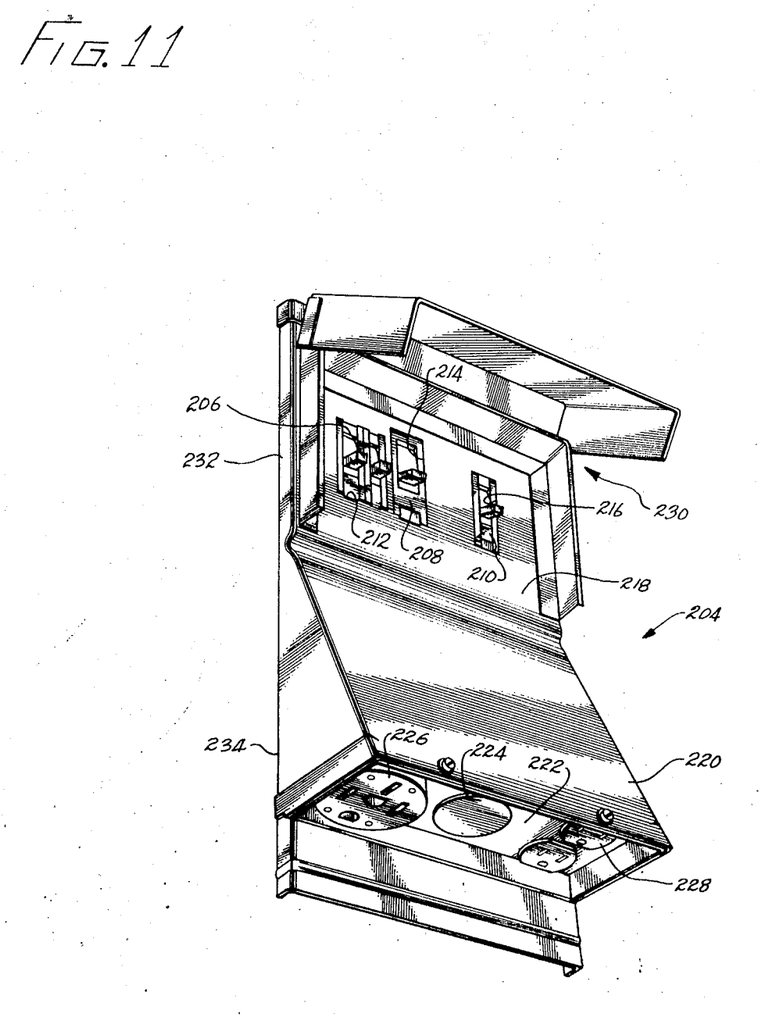
FIG. 11 is a perspective view of an alternate embodiment of the FIG. 10 embodiment.

In some instances a mobile unit to be serviced requires wiring directly to a circuit breaker, but also has service adaptable to plug receptacles. The embodiment of the invention shown in FIG. 11 provides this multiple outlet service. In FIG. 11, a circuit breaker plate 204 essentially identical to circuit breaker plate 180 provides for three circuit breakers 206, 208 and 210 through cutouts 212, 214 and 216, respectively, in a wall 218. A flared-out portion 220, which corresponds to flared-out portion 186 of FIG. 10, except for a difference in its bottom wall 222, provides for the passage of a conduit from a mobile unit to be serviced. Provision for such passage is provided by an opening 224. Bottom wall 222, however, also mounts plug receptacles 226 and 228 for two of the three circuit breakers 206, 208 and 210. Receptacles 226 and 228 are wired to their circuit breakers in a standard manner either before breaker plate 204 is mounted on housing 60 or permanently. In the latter case, breaker plate 204 carries the circuit breakers associated with the receptacles.

Circuit breaker plate 204 also has a rain guard 230 which is identical to those previously described and sidewalls 232 and 234 which are identical to sidewalls 200 and 196 of the FIG. 10 embodiment. These features will therefore not be further described.

I claim:
1. An electric service center for supplying power to mobile units comprising:
   a. a housing having a portion thereof adapted to be installed in the ground, the housing having a hollow interior and an opening in the front wall thereof, the opening being disposed to be above the ground a predetermined distance when the housing is installed in the ground;
   b. first and second conductors mounted within the housing and insulated therefrom;
   c. a mounting plate removably secured to the housing over the opening in the front wall;
   d. an overload circuit breaking protective device, a plug receptacle and a neutral phase connection each secured to the mounting plate, the circuit breaker and the plug receptacle having the same ampere rating;
   e. means for electrically connecting the plug receptacle to the circuit breaker and the neutral phase connection; and
   f. the circuit breaker and neutral phase connection each including means for respectively electrically engaging the first and second conductors, each of such means being operable to establish its electrical engagement with its associated conductor exclusively by the mounting of the mounting plate to the housing and of breaking its electrical engagement with its associated conductor exclusively by the removal of the mounting plate from the housing thereby allowing similarly constructed mounting plates of different ampere ratings to be similarly removably secured to the housing without the need for altering any electrical circuits.

2. The electric service center claimed in claim 1 wherein the mounting plate has sidewalls overlying complementary sidewalls of the housing, the sidewalls of the mounting plate being sufficiently deep to provide mechanical protection for the circuit breaker, the plug receptacle and the neutral phase connection.

3. The electric service center claimed in claim 2 wherein the circuit breaker mounting plate has a rain guard, the rain guard including an upstanding wall around the top and sides of the plug receptacle and the circuit breaker.

4. The electric service center claimed in claim 3 wherein the rain guard includes a cover connected through a hinge to the circuit breaker mounting plate, the cover having a front wall for overlying the circuit breaker and the plug receptacle in the cover's closed position.

5. The electric service center claimed in claim 4 wherein the front wall of the cover is bounded by a wall which overlies the upstanding wall when the cover is closed, the rain guard being open at its bottom for access to the plug receptacle.

6. The electric service center claimed in claim 3 wherein the upstanding wall has an outwardly flaring lip to divert rain water away from the plug receptacle and circuit breaker to the bottom of the sides of the upstanding wall.

7. The electrical service center claimed in claim 1 wherein the first conductor includes at least one bus bar below the opening in the housing, the bus bar being enclosed by a rigid cylindrical tube.

8. The electrical service center claimed in claim 1 wherein the first conductor includes bus bars with upstanding flanges for receiving mating clips of the circuit breaker, and including an insulator plate overlying these bus bars and having a cutout for receipt of the clips on the upstanding flanges.

9. The electrical service center claimed in claim 8 including a second circuit breaker permanently installed on the bus bars and extending through the cutout.

10. An electric service center for supplying power to mobile units comprising:
   a. a housing having a hollow interior and an opening in its front wall;
   b. a mounting plate removably secured to the housing over the opening in the front wall;
   c. an overload circuit breaking protective device, a plug receptacle and a neutral phase connection each secured to the mounting plate, the circuit breaker and the plug receptacle having the same ampere rating;

d. means for electrically connecting the plug receptacle to the circuit breaker and the neutral phase connection;
e. mating male and female conductor means for the circuit breaker and the housing to electrically couple the circuit breaker to a source of power when the mounting plate is secured to the housing and to electrically uncouple the circuit breaker from the source of power when the mounting plate is removed from the housing; and
f. mating male and female conductor means for the neutral phase connection and the housing to electrically couple the neutral phase connection to the neutral of the source of power when the mounting plate is secured to the housing and to electrically uncouple the neutral phase connection from the neutral of the source of power when the mounting plate is removed from the housing.
e. first physically engaged and electrically connected male and female conductor means for the circuit breaker and the housing for electrically connecting the circuit breaker to a source of power through the first housing conductor means, the first male and female conductor means being disposed and being operable to establish their physical engagement and electrical connection exclusively by the securing of the mounting plate to the housing and of nondestructively breaking their engagement and electrical connection exclusively by the removal of the mounting plate from the housing; and
f. second physically engaged and electrically connected male and female conductor means for the neutral phase connection and the housing for electrically connecting the neutral phase connection to the neutral of the source of power through the second housing conductor means, the second male and female conductor means being disposed and being operable to establish their physical engagement and electrical connection exclusively by the securing of the mounting plate to the housing and of nondestructively breaking their engagement and electrical connection exclusively by the removal of the mounting plate from the housing thereby allowing similarly constructed mounting plates of different ampere ratings to be similarly removably secured to the housing without the need for altering any electrical circuits.

11. The electric service center claimed in claim 10 including:
a. a rain guard cover;
b. means for connecting the rain guard cover to the service center above the circuit breaker and plug receptacle for rotational movement from a closed position overlying the circuit breaker and the plug receptacle to an open position substantially normal to the plane of the circuit breaker mounting plate for access to the circuit breaker and plug receptacle; and
c. the rain guard defining an opening in its bottom when in its closed position for access to the plug receptacle.

12. The electric service center claimed in claim 10 wherein the male and female conductor means for the circuit breaker and the housing include a bus bar mounted within the housing having an upstanding substantially straight flange and a U-shaped clip on the circuit breaker in electric circuit with the internal circuit of the circuit breaker, the U-shaped clip receiving and electrically engaging the flange.

13. The electric service center claimed in claim 12 wherein the male and female conductor means for the neutral phase connection comprises a male member mounted to the circuit breaker mounting plate and a female member mounted within the housing and receiving the male member of the neutral phase connection.

14. The electric service center claimed in claim 10 including:
a. a second overload circuit breaking protective device secured to the mounting plate having the same ampere rating as the plug receptacle;
b. means for electrically connecting the plug receptacle to the second circuit breaker and
c. third physically engaged and electrically connected male and female conductor means for the second circuit breaker and the housing for electrically connecting the second circuit breaker to the source of power through the third housing conductor means, the third male and female conductor means being disposed and operable to establish their physical engagement and electrical connection exclusively by the securing of the mounting plate to the housing and of nondestructively breaking their engagement and electrical connection exclusively by the removal of the mounting plate from the housing.

15. The electric service center claimed in claim 10 including:
a. a second overload circuit breaking protective device secured to the mounting plate;
b. a second plug receptacle secured to the mounting plate having the same ampere rating as the second circuit breaker;
c. means for electrically connecting the second plug receptacle to the second circuit breaker and the neutral phase connection; and
d. third physically engaged and electrically connected male and female conductor means for the second circuit breaker and the housing for electrically connecting the second circuit breaker to the source of power through the third housing conductor means, the third male and female conductor means being disposed and being operable to establish their physical engagement and electrical connection exclusively by the securing of the mounting plate to the housing and of nondestructively breaking their engagement and electrical connection exclusively by the removal of the mounting plate from the housing.

PO-1050
(5/69)

UNITED STATES PATENT OFFICE
CERTIFICATE OF CORRECTION

Patent No. __3,585,456__    Dated __June 15, 1971__

Inventor(s) __Lawrence Phillips, Jr.__

It is certified that error appears in the above-identified patent and that said Letters Patent are hereby corrected as shown below:

In the specification: Column 3, line 30 "complementary" should be --center--. Column 5, line 20, delete "insulation between the blocks 76 to backwall 64 and the". Column 6, line 7, delete "used for the household service, a 30"; line 7, before "air" insert --ampere--. Column 7, line 11, before "removal" insert --the--.

In the claims: Claim 10, Column 9, delete lines 3 through 15 in their entirety, beginning with paragraphs "e. mating male..." and "f. mating male...". Claim 14, Column 10, line 20, after "breaker" insert a semicolon --;--; line 26, before "operable" insert --being--.

Signed and sealed this 14th day of December 1971.

(SEAL)
Attest:

EDWARD M.FLETCHER,JR.         ROBERT GOTTSCHALK
Attesting Officer              Acting Commissioner of Patents